US010799782B2

(12) United States Patent
Spencer

(10) Patent No.: US 10,799,782 B2
(45) Date of Patent: Oct. 13, 2020

(54) SPORTING DISPLAY DEVICE AND METHOD

(71) Applicants: Sony Corporation, Minato-ku (JP); Sony Europe B.V., Weybridge (GB)

(72) Inventor: Lewis Spencer, Basingstoke (GB)

(73) Assignees: Sony Corporation, Minato-ku (JP); Sony Europe B.V., Weybridge (GB)

( * ) Notice: Subject to any disclaimer, the term of this patent is extended or adjusted under 35 U.S.C. 154(b) by 0 days.

(21) Appl. No.: 16/244,564

(22) Filed: Jan. 10, 2019

(65) Prior Publication Data

US 2019/0232146 A1    Aug. 1, 2019

(30) Foreign Application Priority Data

Jan. 26, 2018    (GB) .................................. 1801289.8

(51) Int. Cl.
*A63B 71/06* (2006.01)
*H04N 7/18* (2006.01)
(Continued)

(52) U.S. Cl.
CPC ............ *A63B 71/06* (2013.01); *A63B 61/003* (2013.01); *A63B 71/0605* (2013.01); *A63B 71/0619* (2013.01); *G06F 3/1446* (2013.01); *G09F 9/00* (2013.01); *G09F 9/301* (2013.01); *G09F 9/3026* (2013.01); *G09F 23/0066* (2013.01); *G09F 27/005* (2013.01); *H04N 7/18* (2013.01); *A63B 2024/0037* (2013.01); *A63B 2071/0658* (2013.01); *A63B 2071/0694* (2013.01); *A63B 2102/02* (2015.10); *A63B 2102/20* (2015.10); *A63B 2102/24* (2015.10);
(Continued)

(58) Field of Classification Search
CPC ... A63B 71/06; A63B 71/0619; A63B 61/003; A63B 2071/0694; A63B 71/022
See application file for complete search history.

(56) References Cited

U.S. PATENT DOCUMENTS 5,280,904 A     1/1994  Rodriguez
2013/0120582 A1*  5/2013  Daniels .................. G06T 5/006
                                                348/157
(Continued)

FOREIGN PATENT DOCUMENTS

BE            1022149 B1    2/2016
DE    10 2009 056 915 A1    6/2011
(Continued)

OTHER PUBLICATIONS

British Search Report dated Aug. 2, 2018 in British Application 1801289.8, filed on Jan. 26, 2018.

*Primary Examiner* — Dmitry Suhol
*Assistant Examiner* — Carl V Larsen
(74) *Attorney, Agent, or Firm* — Oblon, McClelland, Maier & Neustadt, L.L.P.

(57) ABSTRACT

A sporting display device comprising circuitry configured to control a plurality of electronic display elements to display one or more electronic images in response to a detection by detector circuitry of an occurrence of a predetermined event associated with a sport, the plurality of electronic display elements being attachable to a sports net associated with the sport in a configuration such that the one or more electronic images are displayed on the sports net.

10 Claims, 12 Drawing Sheets

(51) Int. Cl.

| | | |
|---|---|---|
| *G09F 9/00* | (2006.01) | |
| *G09F 23/00* | (2006.01) | |
| *A63B 61/00* | (2006.01) | |
| *G09F 27/00* | (2006.01) | |
| *G09F 9/30* | (2006.01) | |
| *G06F 3/14* | (2006.01) | |
| *G09F 9/302* | (2006.01) | |
| *A63B 102/24* | (2015.01) | |
| *A63B 24/00* | (2006.01) | |
| *A63B 102/20* | (2015.01) | |
| *A63B 102/02* | (2015.01) | |
| *H04N 5/44* | (2011.01) | |

(52) U.S. Cl.
 CPC ............... *A63B 2243/0025* (2013.01); *A63B 2243/0037* (2013.01); *H04N 7/181* (2013.01); *H04N 2005/4405* (2013.01)

(56) References Cited

U.S. PATENT DOCUMENTS

| | | | |
|---|---|---|---|
| 2013/0286648 A1* | 10/2013 | Berard | A63B 61/003 362/234 |
| 2015/0165625 A1* | 6/2015 | Michalowski | B25J 9/1694 700/259 |
| 2017/0213087 A1* | 7/2017 | Chen | G06K 9/00724 |
| 2019/0160356 A1* | 5/2019 | Lalaoua | A63B 63/004 |

FOREIGN PATENT DOCUMENTS

| | | |
|---|---|---|
| EP | 1 911 499 A2 | 4/2008 |
| GB | 2 409 092 A | 6/2005 |
| GB | 2496428 A | 5/2013 |
| WO | WO 99/07447 A1 | 2/1999 |
| WO | WO 2012/095610 A1 | 7/2012 |
| WO | WO 2016/016492 A1 | 2/2016 |

\* cited by examiner

SPORTING DISPLAY DEVICE AND METHOD

BACKGROUND

Field of the Disclosure

The present technique relates to a sporting display device and method.

Description of the Related Art

The "background" description provided herein is for the purpose of generally presenting the context of the disclosure. Work of the presently named inventor, to the extent it is described in the background section, as well as aspects of the description which may not otherwise qualify as prior art at the time of filing, are neither expressly or impliedly admitted as prior art against the present technique.

In recent years, various technologies have been introduced in sports so as to aid in officiating such sports and/or improving audience interactivity for viewers of such sports. Such technologies are provided by Hawk-Eye Innovations Limited, for example, which has been prevalent in a number of sports including tennis, soccer and cricket in order to help officials (referees, umpires and the like) to make correct decisions with regards to implementing the rules of the sport and to allow audience members (and/or viewers of broadcast content of the sport) to view detailed information relating to the decision at issue.

For example, with the Hawk-Eye tennis system, images of the tennis ball in play are captured by a plurality of cameras and these images are used to determine whether the ball has travelled outside the boundaries defining the tennis court within which the ball must stay Such a system has been successfully used in a number of international tennis competitions, and helps provide improved certainty for certain decisions of the match (in particular, decisions as to whether a ball is "in" or "out" in cases in which ball speed, ball positioning, player positioning and/or other factors would otherwise make it difficult for the umpire to reach the right decision). Furthermore, the system is able to provide computer-generated images of a tracked path of the ball on a large electronic screen in the stadium, and on television in a viewer's home, thereby improving audience interactivity with the tennis match (in particular, with regards to key decisions associated with the game).

A problem, however, is that, in order to provide this improved audience interactivity, it is necessary for the audience to take their gaze away from the physical space in which the sport is being played (e.g. the tennis court) in order to view the electronic screen (which is typically placed away from the area in which the sport is being played at a higher location within the stadium and/or towards the edge of the stadium so as to enable audience members to view the electronic screen). This is inconvenient for audience members, who must change their head and/or eye positions in order to switch their gaze from the area within which the sport is being played to area within which the electronic screen is positioned. It may also be the case that, even though an audience member may have a good view of the area in which the sport is being played, they may not have a very good view of the electronic screen (which, as previously mentioned, is typically located in a different location to that of the area within which the sport is played). Such problems are particularly pertinent for real-time data displayed on the electronic screen (that is, information which is displayed on the electronic screen whilst the sport is still in progress), since, when an audience member looks in the direction of the sports area, they may miss important information provided on the electronic screen and, conversely, when the audience member looks in the direction of the electronic screen, they may miss important events happening in the sports area.

Further, in some embodiments, for example especially in basketball and soccer, it is not always clear to an audience member whether the ball has entered the hoop or net or whether the ball has only hit the netting on the outside. Accordingly, it may sometimes take time for an audience member to establish whether there has been a scoring event.

There is therefore a need to alleviate at least one of these problems.

SUMMARY

The present technique is defined by the claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
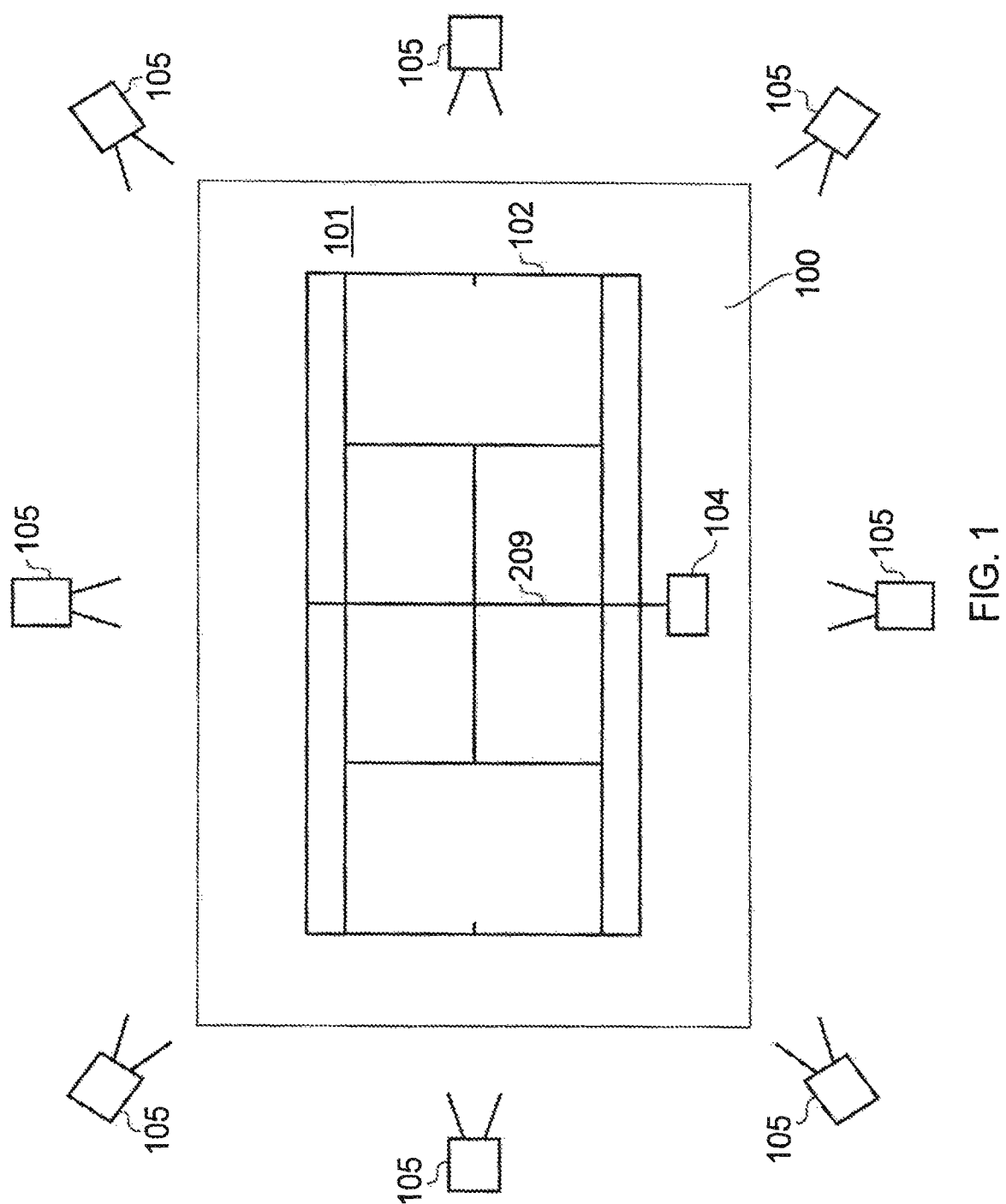
FIG. 1 schematically shows an example sport with which embodiments of the present technique may be used.

Referring now to the drawings, wherein like reference numerals designate identical or corresponding parts throughout the several views.

FIG. 1 shows an example sport with which the present technique may be used. The sport is tennis and therefore the sports area shown in FIG. 1 is a tennis court 100. The tennis court comprises a surface 101 (such as grass or clay) on which a number of lines 102 are marked so as to define the area of play. Each of the lines 102 is used to define an area within which the ball must be located at one or more different stages of the game, according to the game rules. The tennis court also includes a net 209 over which players must hit the ball to each other. The net is connected to a sporting display device 104 (to be explained later). Arranged around the tennis court is a plurality of cameras 105 each with a different respective field of view of the tennis court. Each of the plurality of cameras 105 is configured to capture respective images of the tennis court. This allows the position of the ball within the area of the tennis court 100 to be tracked using the images captured by the cameras 105. The cameras are typically positioned in advance of a tennis match and are calibrated with reference to a 3D model of the tennis court. This allows a precise position of the ball within the model of the tennis court (and therefore within the tennis court itself) to be determined based on two or more of the captured images at a given point in time. Such systems which use images captured by one or more cameras in different respective positions to track the position of an object within a predefined 3D space are known in the art and are therefore not discussed in detail here. For example, such systems are available from Hawk-Eye Innovations Limited. Systems like that shown in FIG. 1 allow the position of the tennis ball relative to the lines 102 and net 103 to be determined very accurately and can therefore be used to help officials of a tennis match make correct decisions (e.g. whether or not a ball is "in" or "out") when applying the rules of the game during a tennis match.

Figure 2:
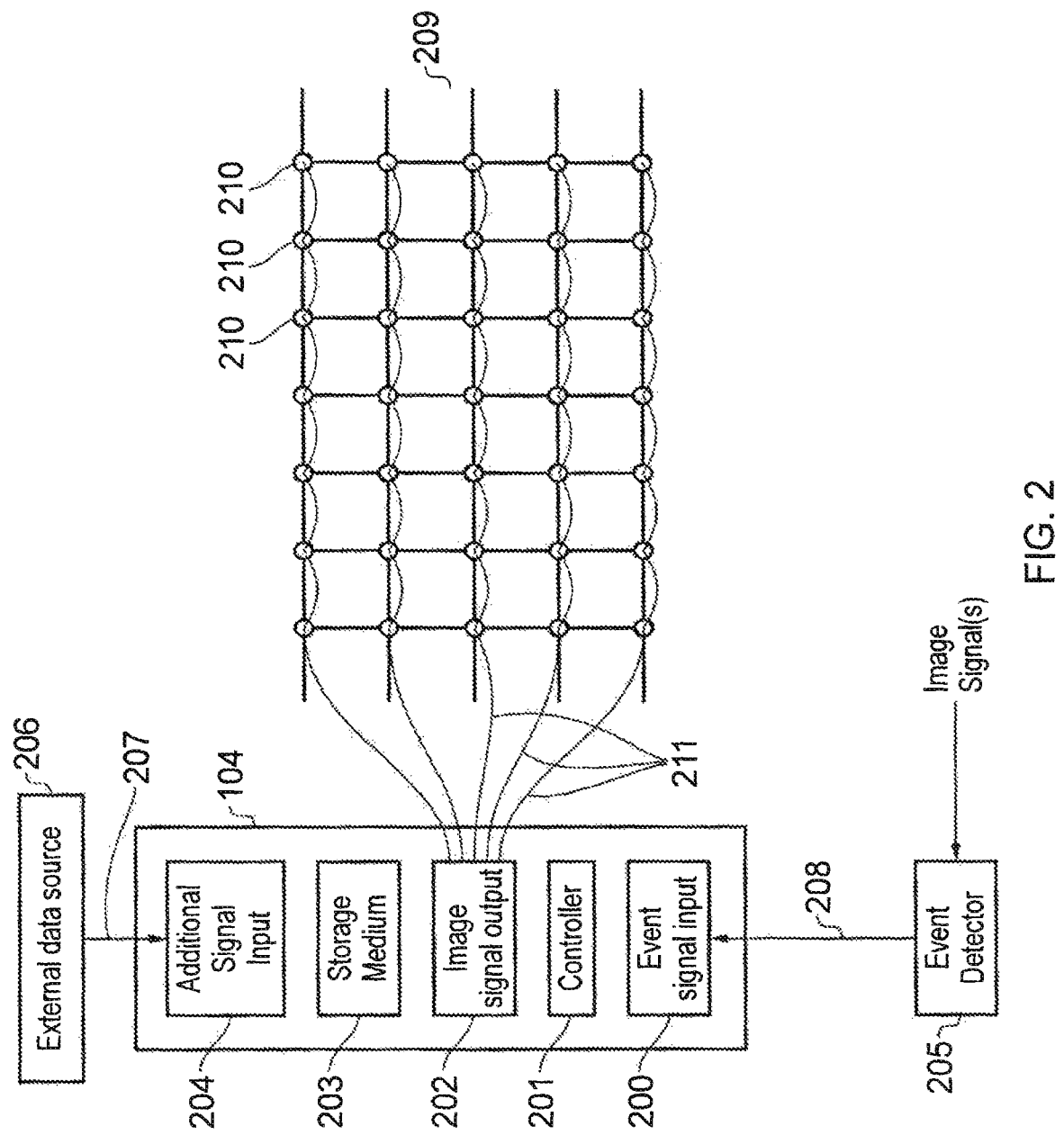
FIG. 2 schematically shows a sporting display device according to an embodiment.

FIG. 1 also shows a sporting display device 104 which is exemplified in more detail in FIG. 2. The sporting display device 104 comprises an event signal input 200, a controller 201, an image signal controller 202, a storage medium 203 and an additional signal input 204. The event signal input 200 receives a signal 208 from an event detector 205 for detecting the occurrence of a predetermined event associated with a sport. In general, the predetermined event may be, for example, the occurrence of a ball crossing a boundary defining an area within which a sport is played (such as the lines defining a goal line in soccer) or another event such as the ball contacting a sports net (such as a tennis net) used in the sport. The event detector 205 is able to detect such events using any suitable known technique. For example, the event detector 205 may detect the occurrence of a predetermined event based on one or more images captured by a plurality of cameras 105 or be based, at least in part, on another device such as a motion sensor, accelerometer, gyro sensor or the like on a net. In such an embodiment, the image signals received by the event detector 205 comprise data representative of the one or more captured images.

The external data source 206 provides a signal 207 to the additional signal input 204 of the sporting display device 104. The information contained within this signal 207 is different to the information contained in the signal 208 transmitted to the event signal input 200 from the event detector 205. In particular, the event signal 208 indicates that a predetermined event associated with the sport concerned has occurred whereas the signal 207 indicates additional data which may be used for generating images to be displayed on a sports net 209 (to be explained later). The additional data comprised within signal 207 may comprise, for example, statistical data relating to the sport being played, historical sports data, data indicative of the current score of other instances of the sport being played (e.g. the score of a tennis match being played concurrently with the tennis match with which the sporting display device 104 is associated) or the like. Indeed, the additional data may include real-time data associated with the game for example, the speed of the ball in tennis or soccer. This may be established by ball tracking.

The storage medium 203 stores any data necessary for the sporting display device 104 to perform its various functions. In particular, the storage medium 203 (which may comprise magnetic or solid state memory, for example) stores digital data on the basis of which one or more predetermined electronic images for display on the net 209 (to be explained later) may be generated.

The image signal controller 202 controls electronic display elements 210 attached to the sports net 209 to display the generated one or more predetermined electronic images. That is, the image signal controller 202 controls each of the individual display elements 210 via control lines 211 to display a certain colour and/or brightness at a certain time so that, when the net 209 is viewed from a certain distance (e.g. at the distance at which an audience member is viewing the net 209 whilst watching the sport with which the net is associated), the combination of the individual colours and/or brightness output by each display element 210 produces an image. In an embodiment, each electronic display element 210 comprises one or more light emitting diodes (LEDs). For example, if colour is to be displayed, each element 210 will comprise Red, Blue and Green LEDs. It will be appreciated, however, that another type of technology may be used for the display elements 210. In general, any electronic display element which, in combination with the other electronic display elements, is able to display a certain colour and/or brightness in response to a signal output by the image signal controller 202 so as to enable an image to be generated by the plurality of electronic display elements may be used with the present technique. The image signal controller 202 may control images to be displayed using the plurality of display elements 210 via any suitable software or hardware. In one example, the image signal controller 202 controls the display elements 210 to produce electronic images which are viewable on the net 209. The images to be displayed on the net is decided by software such as Madrix lighting control software.

The operation of each of the events signal input 200, image signal controller 202, storage medium 203 and additional signal input 204 is controlled by the controller 201. In particular, the controller 201 comprises processing circuitry configured to process instructions for controlling each of the elements 200, 202, 203 and 204. In general, each of the elements 200, 201, 202, 203 and 204 may be implemented using suitable software and/or hardware. In particular, each of these elements may be implemented using appropriately configured circuitry.

It will thus be appreciated that, in general, the sporting device 104 comprises a plurality of electronic display elements 201 attachable to a sports net 209 in a configuration such that electronic images are displayable on the sports net 209 using the plurality of electronic display elements 210. The controller 201 is configured to control the plurality of electronic display elements 210 to display one or more electronic images (the one or more images being generated based on data stored in advance in the storage medium 203, for example) on the sports net 209 in response to a detection by the event detector 205 of the occurrence of a predetermined event (such as a ball crossing a boundary of a sports area) associated with a sport with which the sports net is associated. Of course, the images may also be provided from an external source or be created entirely based upon events in the game (for example, the images may appear to show the word "IN" scrolling across the net).

Figure 3A:
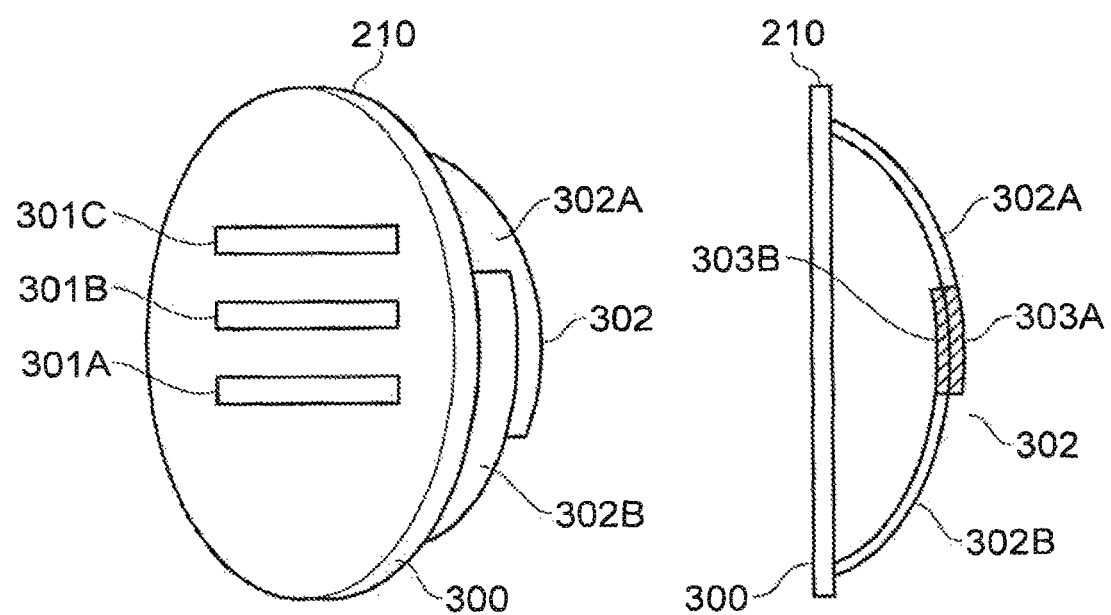
FIGS. 3A and 3B schematically show, respectively, an electronic display element and a sports net according to an embodiment.
Figure 3B:
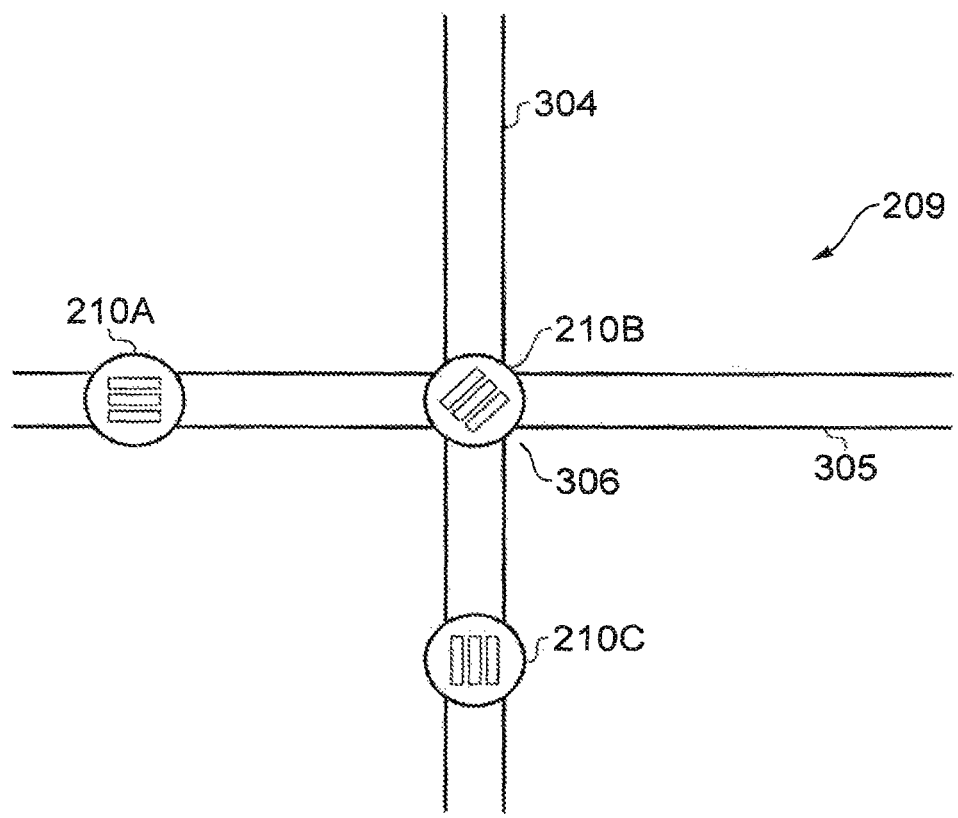

FIGS. 3A and 3B show, respectively, how an example electronic display element 210 and an example sports net 209 to which a plurality of electronic display elements are attached. In this example, each electronic display element is an LED electronic display element.

As shown in FIG. 3A (which shows a single electronic display element for use with the present technique as viewed from two different perspectives), the electronic display element 210 comprises a main body 300 comprising three illuminating elements 301A, 301B and 301C. In this example, each of the illuminating elements 301A, 301B and 301C is an LED. Each of the illuminating elements is a different colour. In particular, illuminating element 301A is red, illuminating element 301B is green and illuminating element 301C is blue. Any colour consisting of a combination of red, green and blue (RGB) light may therefore be formed using the illuminating elements 301A, 301B and 301C. It will be appreciated that the configuration of the illuminating elements shown in FIG. 3A is only an example, and that a different combination of the three elements may be used (e.g. there may be more than one element of a certain colour and the position and/or shape of each of the elements may be different).

Each of the electronic display elements 301A, 301B and 301C are comprised within the main body 300, which also comprises appropriate circuitry (not shown) for controlling the illuminating elements 301A, 301B and 301C according to signals received from the image signal controller 202. The control of RGB illuminating elements in response to a control signal is known in the art and therefore is not described in detail here. The electronic display element 210 also comprises a fastening element 302 for fastening the electronic display element to the sports net 209. The fastening element 302, in this example, comprises two straps 302A and 302B for wrapping around a strand or vertex of the sports net 209 (to be explained later) and which can then be fastened together via respective securing elements 303A and 303B so as to secure the electronic display element 210 in place on the net 209. The securing elements 303A and 303B may take any suitable form. In one example, the securing elements 303A and 303B implement a hook and loop mechanism (such as Velcro®) in which one of the elements comprises a plurality of loops and the other of the elements comprises a plurality of hooks which engage with the plurality of loops. This allows the two straps of the fastening element 302A and 302B to be releasably secured together whilst wrapped around a strand or vertex of the sports net 209, thus keeping the electronic display element 210 in place on the net 209 whilst also allowing the electronic display element 210 to be removed from the net (or placed at a different location on the net) at a later time. In another embodiment, the securing elements 303A and 303B may comprise an adhesive so as to permanently adhere the securing elements 303A and 303B (and therefore the straps 302A and 302B) together, thus permanently fastening the display element to the net 209. Of course, other mechanisms for the securing elements are envisaged such as a physical clip which would reliably secure the display element to the net.

FIG. 3B shows a plurality of electronic display elements 210A, 210B and 210C attached to a sports net 209, according to an embodiment. The sports net 209 is a flexible matrix comprising a plurality of elongated vertical portions 304 (one of which is shown here) and elongated horizontal portions 305 (one of which is shown here) attached to each other at a plurality of vertices 306. The elongated vertical and horizontal portions may be referred to as "strands". The strands are made of a flexible material which allows the net to change shape in response to pressure applied to the net. In particular, the material from which the strands are comprised is sufficiently flexible so as to enable the net to be stretched out in a planar fashion (e.g. as shown for the tennis net 209 in FIG. 1) or to be rolled or folded for storage. The flexibility of the strands also enables the net to flex on impact with a playing article such as a ball so as to remove kinetic energy of the playing article. An example of this is a tennis net which, when hit with the tennis ball, causes the kinetic energy of the tennis ball to be transferred to the net, thereby slowing the ball down sufficiently to allow it to be determined that the ball has hit the net and that a point in the game may therefore be awarded appropriately (the removal of the kinetic energy of the ball also allows it to be collected easily due to it slowing down). Each of the vertical strands 304 is connected to each of the horizontal strands 305 at a vertex 306. The vertical and horizontal strands are secured together at the vertex 306 so as to prevent relative movement of the vertical and horizontal strands at the vertex (the vertical and horizontal strands being secured at the vertex by any suitable means such as an adhesive or via twine wrapped around the vertical and horizontal strands at the vertex or knotted or interwoven together, for example). Such an arrangement provides the matrix-like shape of the net 209. The various materials and methods through which nets 209 may be manufactured are known in the art and are therefore not described in detail here.

FIG. 3B shows the various positions in which the electronic display elements may be fastened to the net 209 using the fastening element 302.

In a first example, as shown for the electronic display element 210A, the electronic display element is attached only to a horizontal strand 305 of the net 209. In this case, the two straps 302A and 302B of the display element 210A wrap around the horizontal strand 305 in a vertical direction and are secured together by the securing elements 303A and 303B so as to fasten the display element 210A to the horizontal strand 305.

Alternatively, as shown for the display element 210C, the display element may be attached to a vertical strand 304 by wrapping the two straps of the fastening element 302A and 302b around the vertical strand 304 in the horizontal direction and securing them together using the securing elements 303A and 303B, thereby fastening the display element to the vertical strand 304. It is noted that, for the display element 210C, the straps of the fastening element 302A and 302B are wrapped sufficiently tightly around the vertical strand 304 so as to enable the display element 210C to be held in place on the vertical strand 304 by friction (thereby preventing the display element 210C from travelling vertically along the vertical strand 304 under gravity).

Alternatively still, the display element may be fastened to a vertex 306 at which a vertical strand 304 and horizontal strand 305 are connected. In this case, as exemplified by the display element 210B, the straps of the fastening element 302A and 302B are wrapped around both the vertical strand 304 and horizontal strand 305 in a diagonal direction and are secured together via the securing elements 303A and 303B, thereby fastening the display element 210B to the net 209 at the vertex 306.

It is noted that, although the straps of the fastening element 302A and 302B cannot be seen in FIG. 3B (since the display elements 210A, 210B and 210C are viewed from a frontal direction), the direction in which the straps of the fastening element 302A and 302B are wrapped around the vertical and/or horizontal strands is indicated by the orientation of the illuminating elements of each of the display elements 210A, 210B and 210C shown in FIG. 3B (each of the illuminating elements 210A, 210B and 210C shown in FIG. 3B having the structure as illustrated in FIG. 3A).

It will thus be appreciated that each of the display elements 210 may be fastened to the net 209 at any point on the net 209, whether this is on a vertical strand only, a horizontal strand only or both a horizontal and vertical strand at a vertex between the strands. This enables a sufficient number of display elements 210 to be attached to the net 209 at a sufficiently small distance relative to each other so as to enable images of a predetermined resolution to be displayed on the net 209 using the display elements 210. Of course, any misalignment may be managed by the mapping of the display elements 210 by the controller 210. It is noted that, for the sake of simplicity of explanation, the net and display element combination shown in FIG. 2 only shows display elements 210 fastened to the vertices of the net 209 (each of the display elements 210 being electrically connected to the image signal controller 202 via the control lines 211). However, it will be appreciated that, in reality, many more display elements 210 may be provided between the vertices in both the horizontal and vertical directions (e.g. in the manner as exemplified for display elements 210A and 210C in FIG. 3B) in order to provide higher resolution electronic images.

FIGS. 4 to 10 show a number of examples relating to how the present technique may be used.

In one example, the predetermined event detected by the event detector 205 is an object associated with the sport with which the sports net is associated crossing a boundary defined for the sport with which the sports net is associated. The one or more electronic images displayed using the display elements fastened to the net indicate that the boundary has been crossed by the object.

In one example, the boundary defines an area within which the object must remain according to a rule of the sport and the predetermined event comprises the object leaving the area defined by the boundary. The one or more electronic images displayed using the display elements 210 then indicate that the object has left the area defined by the boundary.

Figure 4:
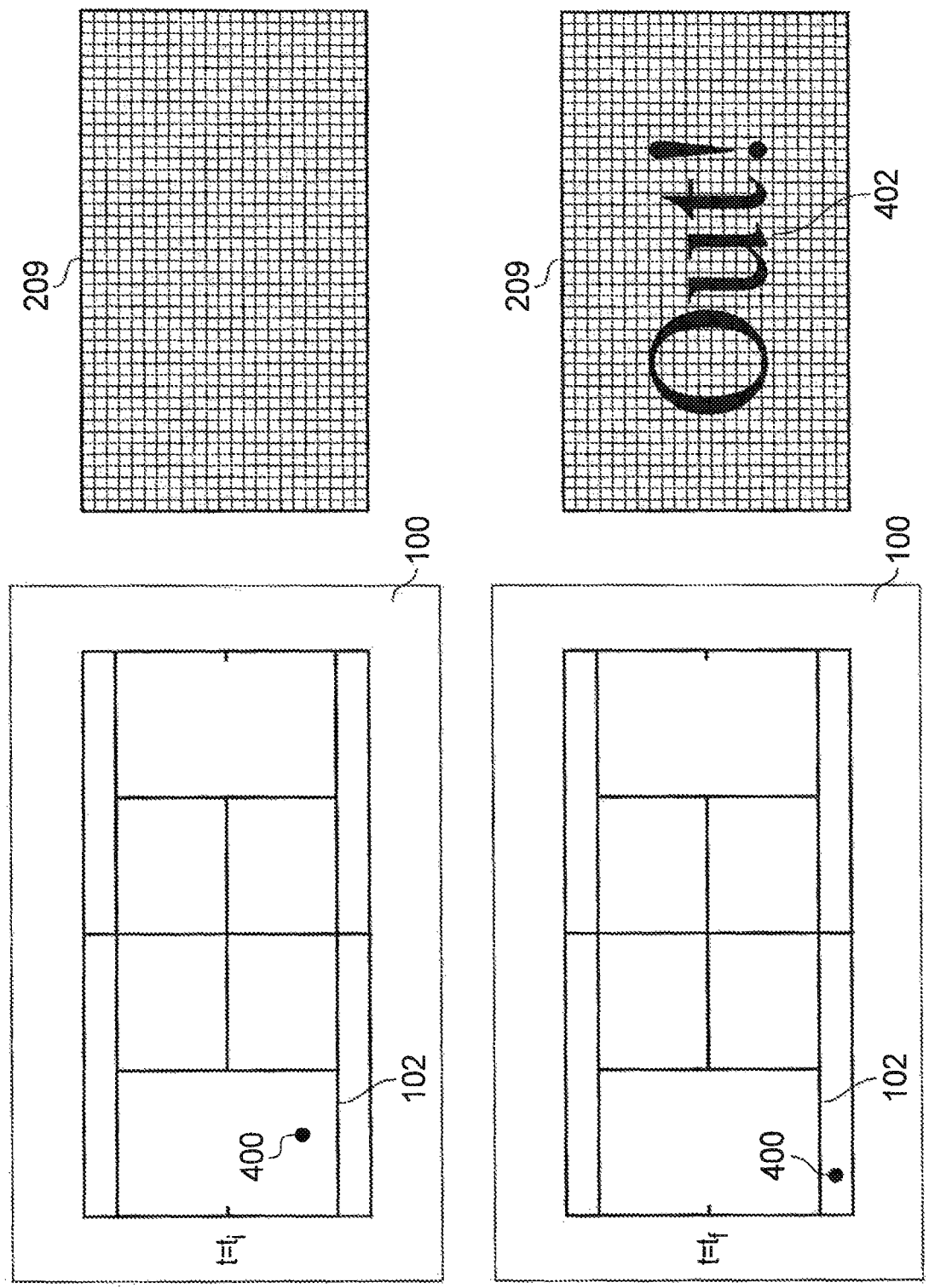
FIG. 4 schematically shows a first example application of the present technique.

An example of this is shown in FIG. 4, in which the object is a tennis ball 400 used during a tennis match played on a tennis court 100. As previously described with reference to FIG. 1, for example, the position of the tennis ball 400 may be tracked using a plurality of images captured using a plurality of cameras 105 which are then processed by the event detector 205 in order to determine the position of the ball. The position of the ball is determined based on the captured images. A 3D model of the tennis court 100 is used to give a reference frame for that position.

In FIG. 4, it can be seen that, at a first time t=$t_i$, the ball 400 is within the area within which the ball must first bounce during a "singles" tennis match (the sport described with reference to FIG. 4 is "singles" (i.e. one against one) tennis rather than "doubles" (i.e. two against two) tennis). Because the ball is "in" at this point in time, the net 209 comprising the plurality of display elements displays no image (or, alternatively, a blank image). However, at a later time, t=$t_f$, it is seen that the ball 400 has travelled outside of the area within which the ball 400 must remain (according to "singles" tennis rules) by crossing the boundary 102. The ball is now "out". In response to this, the event detector 205 determines that the ball is "out" and transmits a signal 208 indicative of this to the event signal input 200 of the sporting display device 104. In response to this event signal, the controller 201 controls a suitable image to be retrieved from the storage medium 203 and controls the image signal controller 202 to control the display elements 210 fastened to the net 209 to display the image retrieved from the storage medium 203 on the net 209. For the sake of clarity, the electronic display elements 210 are not shown in FIG. 4. The electronic image 402 displayed using the plurality of electronic display elements is, however, shown. In this case, the image displayed on the net 209 is an image comprising the word "Out!" thereby indicating to the audience of the tennis match that the ball is now out.

In another embodiment, rather than an object crossing a boundary indicating that an object has left an area within which the object must remain according to a rule of the sport, it may be that a participant of the sport advances according to a rule of the sport when the object crosses the boundary. In this case, the one or more electronic images displayed using the display elements 210 fastened to the net 209 indicate that the participant of the sport has advanced. It should be noted that in embodiments, a participant may be an individual or a group of individuals such as a pair, team or the like.

Figure 5:
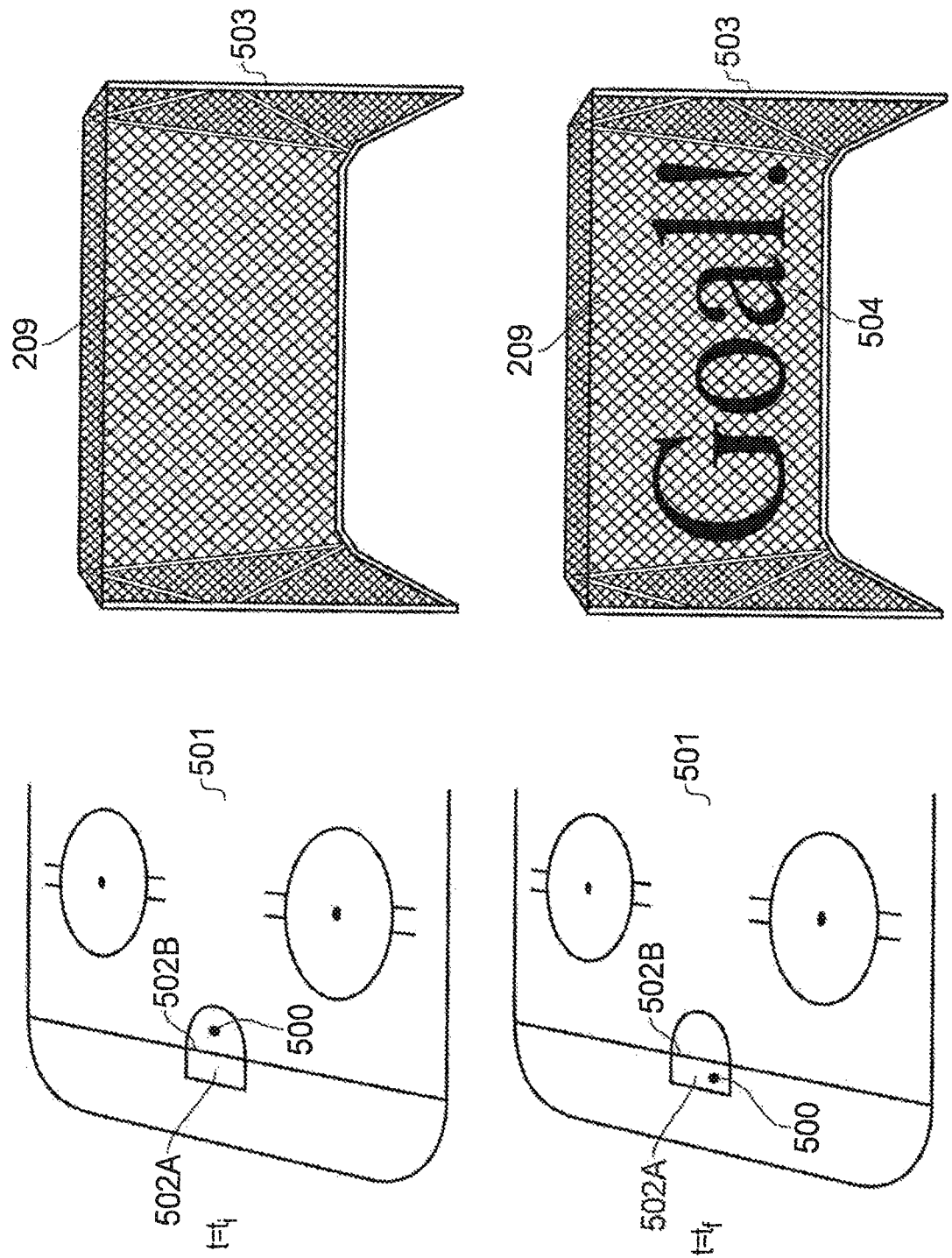
FIG. 5 schematically shows a second example application of the present technique.

An example of this is shown in FIG. 5, in which the sport concerned is ice hockey and in which the object concerned is a hockey puck 500. In ice hockey, a team scores a goal (and therefore advances in the game) when the hockey puck 500 enters a goal area 502A guarded by the opposing team. The puck 500 is judged to have entered the goal area 502A when the puck fully crosses a boundary 502B defined on the ice hockey rink 501. The position of the puck 500 on the rink 501 may be tracked using a plurality of cameras 105 and the detection of the crossing of the boundary 502B by the puck 500 (indicating that a goal has been scored) may be detected based on images captured by those cameras by the event detector 205 (in a similar way to that previously described for the sport of tennis).

In this case, the net 209 is suspended from a goal frame 503 enclosing the goal area 502A (the net 209 and the frame 503 thus forming a receptacle for receiving the puck 500 when it enters the goal area 502A). In the example of FIG. 5, at a time t=$t_i$, the puck 500 is determined to be outside of the goal area 502A because it has not crossed the boundary 502B. No image (or, alternatively, a blank image) is therefore displayed on the net 209 using the display elements 210 (again, for the sake of clarity, the display elements 210 are not shown in FIG. 5). At a later time t=$t_f$, however, it is determined that the puck 500 has crossed the boundary 502B and is therefore located within the goal area 502A. This is detected by the event detector 205 based on the image signals received from the plurality of cameras (not shown in FIG. 5). The event detector 205 therefore transmits a signal 208 indicating that the puck 500 has entered the goal area 502A to the event signal input 200. In response to this, the controller 201 controls an image 504 comprising the word "Goal!" to be retrieved from a storage medium 203 and controls the image signal controller 202 to control the plurality of electronic display elements fastened to the net 209 to display the image 504. This indicates to the audience that a goal has been scored.

Figure 6:
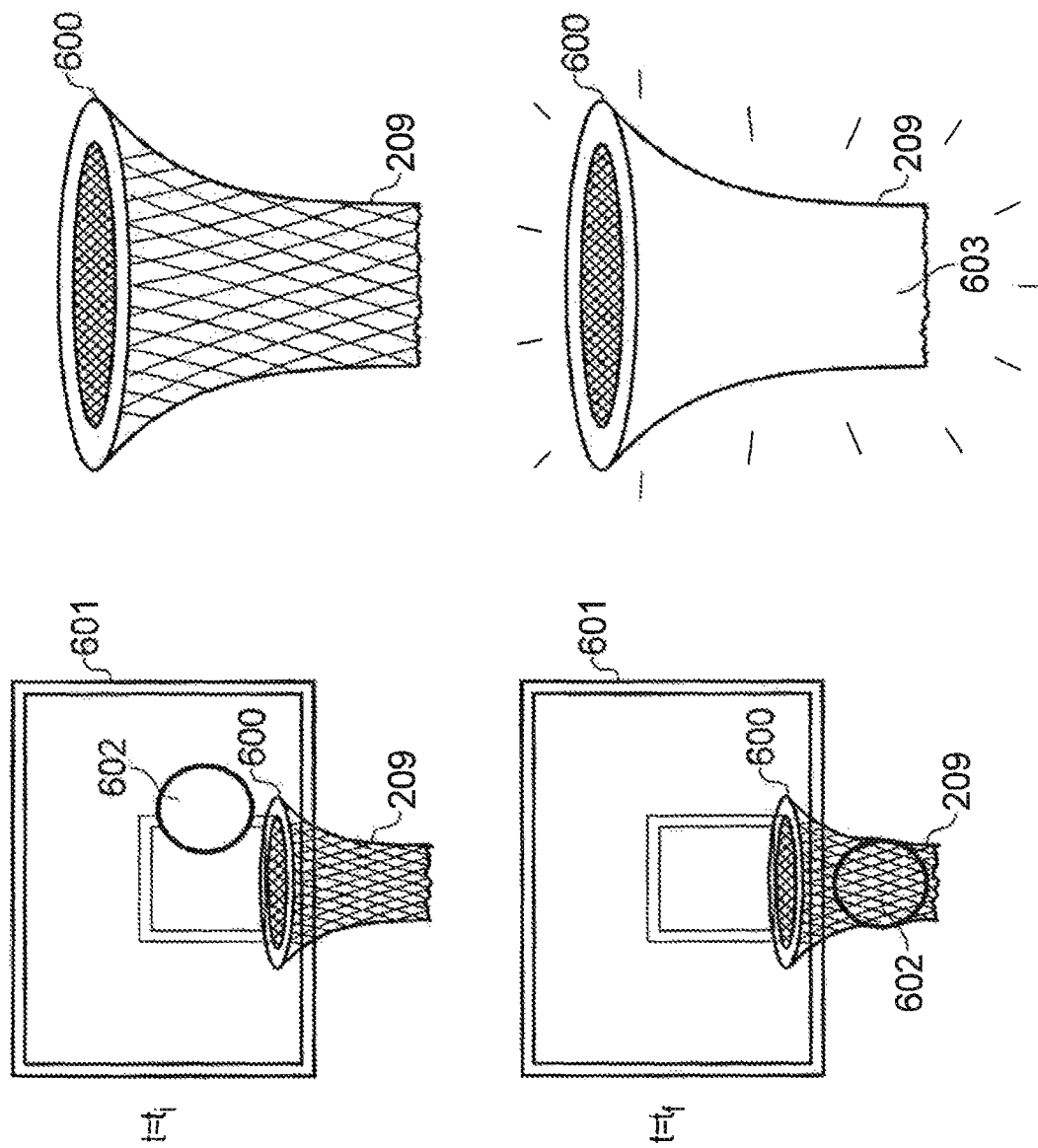
FIG. 6 schematically shows a third example application of the present technique.

FIG. 6 shows another example application of the present technique in which an object crossing a boundary indicates the advancement of a participant of a sport. In this case, the sport is basketball and the object is a basketball 602. In this case, the net 209 is suspended from a rigid hoop 600 which, in turn, is attached to a rigid backing board 601. A scoring event occurs by a basketball team when the basketball 602 passes through the rigid hoop 600 (the rigid hoop 600 therefore defines the boundary which the basketball 602 must cross in order for a point to be scored). Again, this may be determined using one or more cameras which feed image signals representative of images captured by each of the respective cameras to the event detector 205. As shown in FIG. 6, at a first time t=t$_i$, the basketball 602 has not crossed the boundary defined by the hoop 600. The display elements 210 fastened to the net 209 are therefore controlled not to show an image (or, alternatively, to show a blank image). The display elements 210 fastened to the net 209 are again not shown in FIG. 6 for the sake of clarity. At a later time t=t$_f$, however, the basketball 602 is detected to have crossed the boundary defined by the fixed hoop 600. This event is detected by the event detector 205 based on the image signals received from the one or more cameras and a signal 208 indicative of the detected event is transmitted to the event signal input 200 or by sensors such as motion sensors, accelerometers or gyro sensors mounted on the net. These sensors may be used in conjunction with or independent from the image signals received. In response to this, the controller 201 retrieves data representative of the electronic image to be displayed from the storage medium 203 and controls the image signal controller 202 to control the display elements 210 fastened to the net 209 to display the image 603. In this case, the image 603 is a bright, solid colour (such as white) which causes the net 209 to appear illuminated in response to the basketball 602 passing through the plane defined by the hoop 600. This signals to the audience that a point has been scored. It will be appreciated that, alternatively to the image 603 being a bright, solid colour, the image may comprise a word such as "Hoop!" or "Dunk!" in response to the basketball 602 passing through the hoop 600.

In another embodiment, the predetermined event detectable by the event detector 205 is an object associated with the sport contacting the sports net 209 itself. The one or more electronic images displayed on the net 209 using the plurality of display elements 210 then indicates that the object has contacted the sports net. Again, as with the detection of an object crossing a boundary in a sport (which occurs based on one or more captured images of the object and the boundary), an object-net contact event may be detected using one or more captured images of the object and the sports net 209. Again, such an arrangement may be implemented using one or more cameras which feed respective image signals to the event detector 205 (or a sensor on the net as described above) which then determines whether or not the object has contacted the net using a suitable image processing technique. Again, the details of such techniques are known in the art and are therefore not discussed in detail here.

Figure 7:
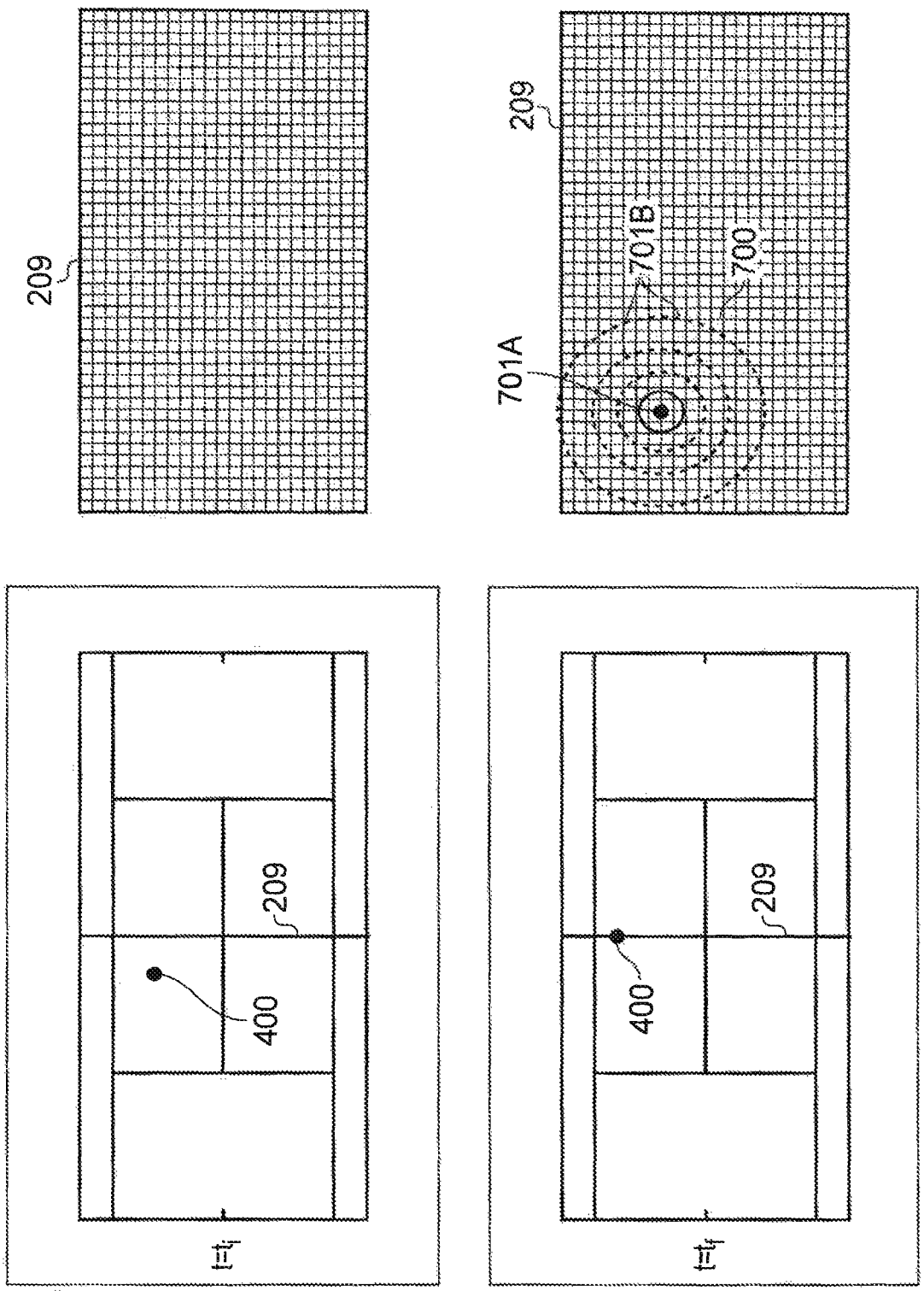
FIG. 7 schematically shows a fourth example application of the present technique.

An example of such an embodiment is shown in FIG. 7. In this case, the sport is once again tennis played on a tennis court 100 with a tennis ball 400. This time, however, instead of the event detector 205 detecting whether or not the ball 400 crosses a boundary so as to leave the legal play area, the event detector 205 (based on images captured by one or more respective cameras) determines whether or not the ball 400 has contacted the net 209. At a first time, t=t$_i$, it is determined that the ball 400 is not in contact with the net 209. No image (or, alternatively, a blank image) is therefore displayed on the net 209. On the other hand, at a later time, t=t$_f$, it is shown that the ball 400 has contacted the net 209.

Furthermore, based on the images captured by the one or more cameras, the event detector 205 is able to determine the part of the net contacted by the ball 400. This is possible because, for example, the 3D model of the tennis court 100 within which the position of the ball 400 is determined based on the captured images of the cameras calibrated with the 3D model includes a model of the net 209, and therefore a precise position of the ball 400 relative to the net 209 may be determined. Again, ball tracking technology is known in the art and is therefore not discussed in detail here.

In this case, as shown in FIG. 7, at time t=t$_f$, an image 700 is displayed on the net 209 indicating the position at which the ball 400 struck the net 209. In particular, the image 700 comprises a central point 701A (in the form of a solid circle of colour) and a plurality of concentric ripples 701B surrounding the central point 701A. In this case, the image 700 is a moving image in which the ripples 701B are shown to move out from the central point 701A, thus providing the audience with a clear indication of the position on the net 209 at which the ball 400 made contact. Information indicative of the position on the net 209 at which the ball 400 made contact may be included in the signal 208 transmitted from the event detector 205 to the event signal input 200. The controller may then control the image signal controller 202 to control the display elements 210 fastened to the net (the display elements 210 are again not shown for the sake of clarity) to display the image 700 centred at the position indicated by the signal 208. The moving image 700 displayed at the determined position on the net 209 may be stored in advance in the storage medium 203 and retrieved by the controller 201. Of course, any appropriate graphic may be envisaged. For example, the impact velocity of the ball may change the type of graphic or effect of the graphic displayed. In other words, in one embodiment, the intensity of the ripples displayed may change depending on the impact velocity of the ball. It will be appreciated that, in all embodiments, an image displayed on a net 209 may be a moving image or a still image.

It is also noted that, although in FIG. 7, for simplicity, the tennis court 100 is shown only in two dimensions (in an aerial view), as previously mentioned, the event detector 205 will determine a three-dimensional position of the ball 400 based on one or more captured images of the tennis court 100 and a 3D model of the tennis court. The event detector 205 is thus able to distinguish between an event in which the ball 400 travels over the net 209 and an event in which the ball 400 makes contact with the net 209 (even though, from the aerial views shown in FIG. 7, these two events would appear to be indistinguishable).

Figure 8:
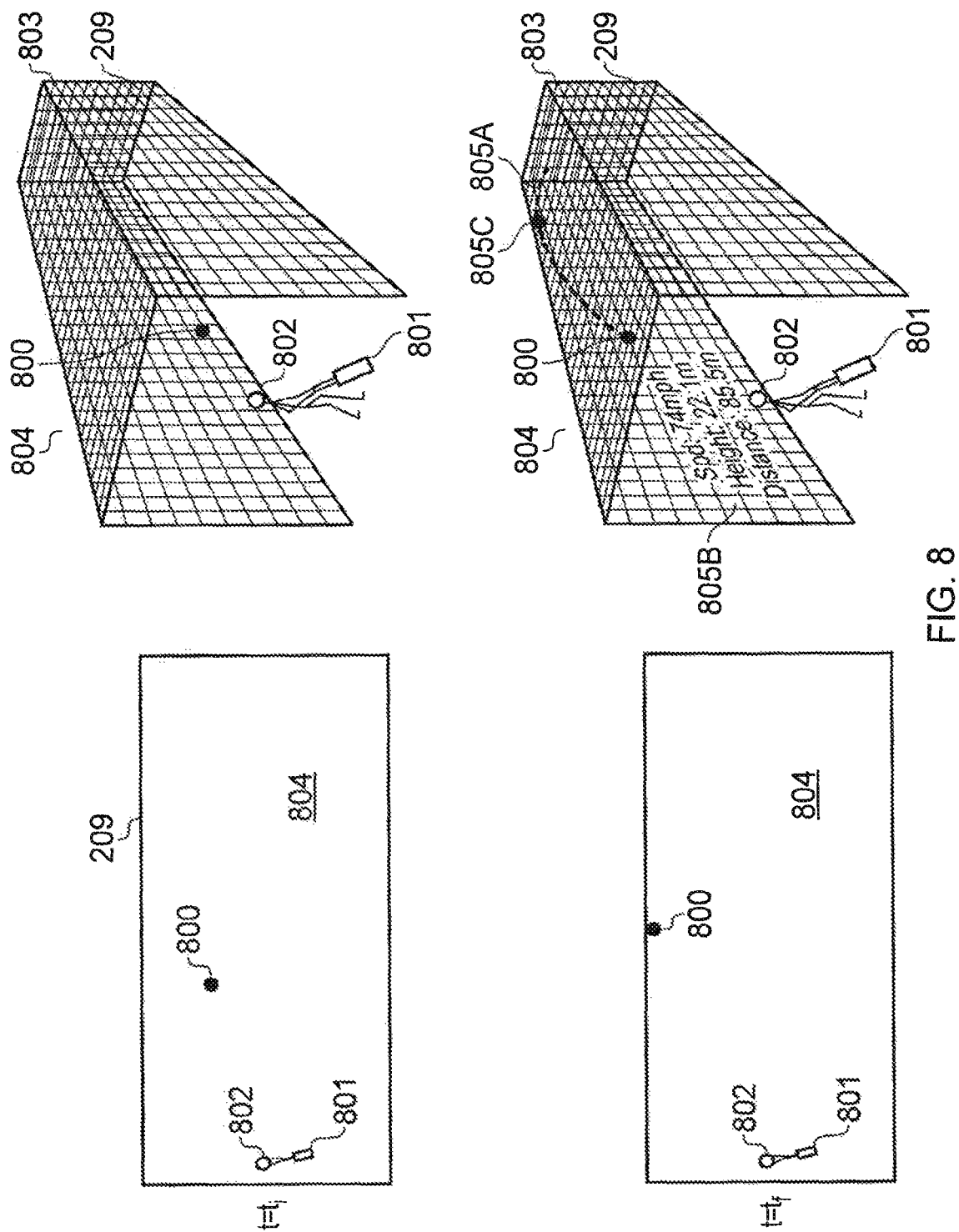
FIG. 8 schematically shows a fifth example application of the present technique.

FIG. 8 shows another example of the present technique in which contact of an object with the net 209 is detected. In this case, the object is a cricket ball 800 which is struck by a cricket player 802 using a cricket bat 801. The ball 800 may be supplied to the cricket player 802 by an automated bowling machine or the like (not shown). In this case, the ball 800 is struck within a batting cage 804, the batting cage 804 comprising a rigid frame 803 which supports the net 209. Such batting cages 804 provide a relatively small volume within which a player 802 may practise batting cricket balls 800 with great force but which (through the use of the net 209) confines movement of the ball 800 such that it remains within the volume bounded by the net 209. This protects passers by and property in the vicinity from potential damage caused by cricket balls and allows the cricket balls to be collected easily by the cricket player 802. As shown in FIG. 8, the present technique may be used to provide the cricket player 802 with additional information relating to their batting performance.

FIG. 8 shows, at two separate times t=t$_i$ and t=f$_f$, an aerial view (on the left hand side) and a perspective view (on the right hand side) of the batting cage 804.

At the first time, t=$t_i$, it can be seen that the ball 800 is not in contact with the net 209. Again, the position of the ball within the batting cage 804 may be determined in three dimensions using one or more cameras and a 3D model of the volume within the batting cage 804. In this case, since the ball 800 has not made contact with the net 209, no image (or, alternatively, a blank image) is displayed on the net 209 using the display elements 210 (again, the display elements 210 are not shown for the sake of clarity). At the later time t=$t_f$, however, it is detected by the event detector that the ball 800 has made contact with the net 209. The event detector 205 therefore transmits a signal 208 to the event signal input 200 indicative of the fact that the ball 800 has made contact with the net 209.

In addition, based on a plurality of images of the ball 800 captured by the one or more cameras at different times whilst the ball is travelling (together with the 3D model information of the batting cage 804), the event detector 205 and/or controller 201 is able to determine further information relating to a predicted trajectory of the ball 800. This information is then used to generate one or more images to be displayed using the display elements 210 fastened to the net 209. This is shown in the perspective view of the batting cage 804 at time t=$t_f$ in FIG. 8. Here, it can be seen that an image is displayed on the net 209, the image comprises a visual trajectory 805A predicted for the ball 800 together with quantitative data 805B relating to the projected trajectory of the ball. In particular, and as may be applicable to any of all the embodiments in this disclosure, the speed, height and distance of the ball 800 according to the predicted trajectory is shown. In this case, the image displayed on the net 209 is a moving image comprising an image 805C of the ball which is shown to follow the predicted trajectory 805A and in which the quantitative data 805B is updated in real time in accordance with the position of the image 805C of the ball at its current point along the predicted trajectory 805A. The quantitative data 805B may be determined using standard kinematic equations by modelling the cricket ball 800 as a projected particle, for example. In this case, both the initial speed of the cricket ball 800 and the angle of elevation of the cricket ball may be estimated by the event detector 205 and/or controller 201 based on the position of the ball 800 as determined from a plurality of images captured successively in time at a known temporal separation, for example. Again, data indicative of the image components 805A, 805B and 805C to be displayed on the net 209 using the plurality of electronic display elements 210 may be stored in the storage medium 203 in advance and retrieved by the controller 201. The controller 201 then controls the image signal controller 202 to control the electronic display elements 210 to display the image components 805A, 805B and 8050 in accordance with the determined quantitative parameters. It will be appreciated that sophisticated moving images (including virtual images such as those of the ball 805C and trajectory 805A) may be generated for display on the net 209 using a suitable computer graphics software module or the like stored in the storage medium 203 and implemented by the controller 201, for example. The use of such graphics software modules is known in the art and will therefore not be described in detail here.

It will thus be appreciated that, as well as the present technique providing information to officials and audiences of sporting events in a more direct and intuitive manner, the present technique may also be used to enhance the experience of sporting participants when playing or practising sport.

As previously mentioned, in addition to the sporting display device 104 receiving a signal 208 from the event detector 205 in response to predetermined events detected during the occurrence of the sport, the sporting display device 104 may also receive additional data from an external data source 206. This additional data is transmitted as part of the signal 207 from the external data source 206 to the additional signal input 204 of the sporting display device 104. This additional data is any data which may be used, together with the event signal 208, to control the electronic display elements 210 to produce one or more images on the net 209.

Figure 9:
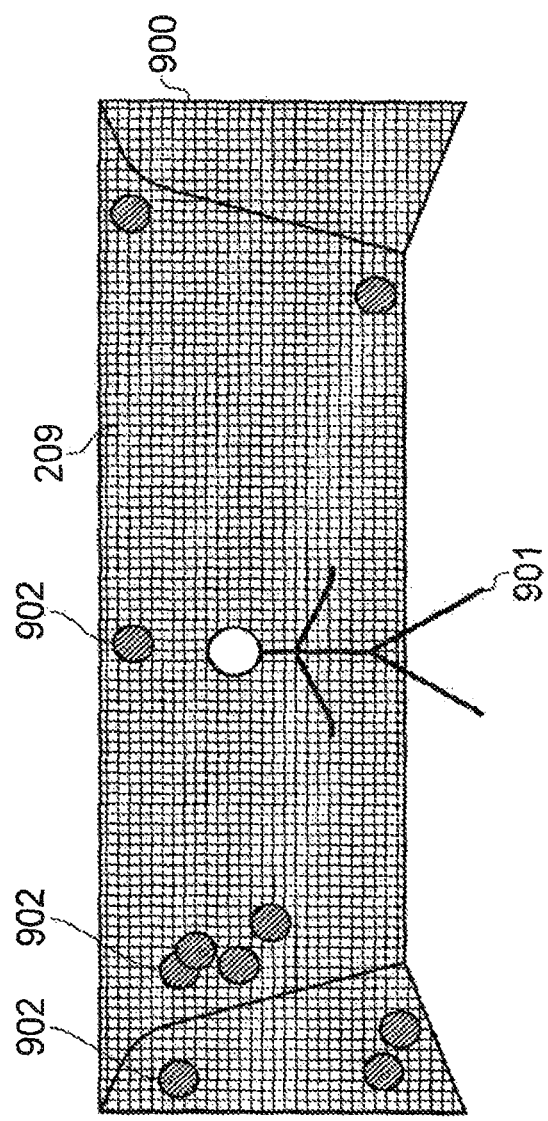
FIG. 9 schematically shows a sixth example application of the present technique.

An example of such additional data is shown in FIG. 9, which shows a set of goalposts used in a game of soccer. The set of goalposts comprises a rigid frame 900 supporting the net 209. When a goal is scored, the team to which the player belongs is awarded a goal and as such advances in the game (in this case, an image comprising the word "Goal!" may be displayed on the net 209, for example, in a similar way as described for the sport of ice hockey in FIG. 5).

In the example of FIG. 9, a penalty kick has been awarded, and the additional data provided from the external data source 206 is historical data indicative of the position at which the ball contacted the net 209 as a result of goals scored during a number of previous penalty kicks (penalty kicks are awarded for infractions of certain rules of the game of soccer and involve a single player from one team attempting to score a goal from a fixed point relative to the goal posts at the same time a single player of the opposing team (the goalkeeper 901) attempting to stop a goal from being scored). Thus, the image displayed on the net 209 comprises a plurality of images of a ball 902 indicating the previous net contact positions of the ball from historical penalty kicks.

In one example the ball positions may be those of previous penalty kicks taken by the penalty taker concerned, thus allowing an analysis of the likely direction in which the ball will be kicked by that penalty taker during the current penalty kick. In this example, the external data source 206 may be an electronic repository storing position data of the soccer ball recorded on a 3D map of the soccer pitch during a previous one or more penalty kicks. This data is then transmitted to the additional signal input 204 of the sporting display device 104 as a signal 207, whereupon the controller 201 controls the image signal controller 202 to control the plurality of electronic display elements 210 fastened to the net 209 (again, the electronic display elements are not shown in FIG. 9 for the sake of clarity) to display the images 902 of the soccer ball. Each of the images 902 may be an image previously stored in the storage medium 203 which is retrieved by the controller 201, for example. As shown in FIG. 9, this allows the audience, broadcasters or the like to predict the direction in which the ball will be kicked during the penalty kick, thus providing an intuitive way of sharing statistical sports information with the audience.

Figure 10:
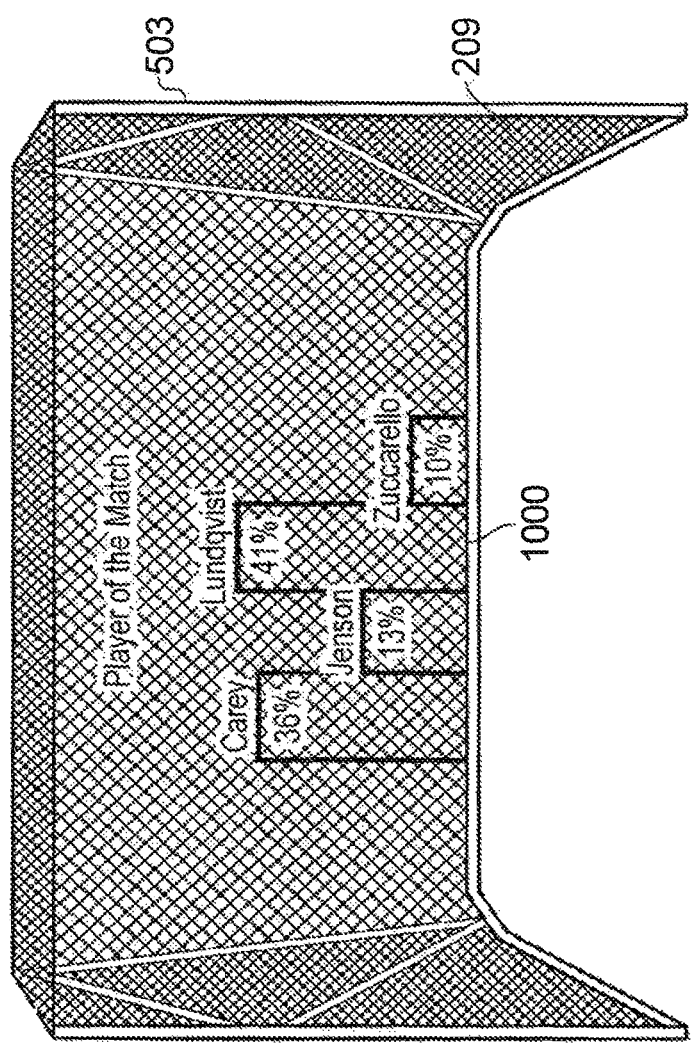
FIG. 10 schematically shows a seventh example application of the present technique.

Another example of additional data is shown in FIG. 10. In this case, again, the sport is ice hockey, and the net 209 is therefore supported on a rigid support 503 so as to form a receptacle in which the ice hockey puck is received when a goal is scored. In this case, the additional data received from the external data source 206 is data indicative of a vote from the audience for the "Player of the Match" (that is, the player that the audience believes deserves particular recognition for their performance during the hockey match). In this case, the external data source 206 may be, for example, a server which receives data indicative of a selected player for "Player of the Match" from each of a plurality of electronic devices (not shown) held by respective audience members. In one example, each of these devices is a smartphone or tablet computer on which a suitable software application ("app") enabling a player to be selected using the device and enabling data indicative of the selected player to be transmitted from the device to the server. An example of such a system which enables this is the SMART Vote system provided by Hawk-Eye Innovations Limited. The received data is then transmitted as part of signal 207 to the additional signal input 204. The controller 201 processes the received data and determines a percentage of the vote allocated to each player. The controller then controls the image signal controller 202 to control the electronic display elements 210 (again, not shown in FIG. 10) to display a graph 1000 indicative of the results of the vote (in this case, the graph is generated for the four players which received the highest proportion of the vote). The graph 1000 may be generated for display on the net 209 using the controller 201, for example (again, the use of such graphics software modules is known in the art and will therefore not be described in detail here). As can be seen in FIG. 10, this allows the audience to see the results of the vote as soon as the results have been processed. It will be appreciated that the external data source 206 (e.g. a server) may obtain data from one or more social media platforms (e.g. Facebook or Twitter®) in order to collect voting data and to provide the voting data to the additional signal input 204 via signal 207 for graphical display of the voting data on the net 209.

It will be appreciated that the above-mentioned embodiments are merely examples of ways in which the present technique may be applications, and that many other applications are possible. In particular, it is envisaged that any predetermined event in any sport which is detectable using a form of automated detection may be used to trigger the generation one or more electronic images which are then displayed using a plurality of electronic display elements (such as LEDs) fastened to a sports net. The electronic display elements may be permanently or releasably attached to the sports net. Each of the electronic display elements 210 is attached to a net 209 in a predetermined position so as to enable images to be generated by the image signal controller 202 based on the predetermined position of each electronic display element 210. For example, each of the display elements 210 may be positioned as a matrix on the net 209 so that the configuration of display elements 210 matches the configuration of pixels in a conventional electronic image (thereby allowing electronic images displayed on the net to appear natural and comfortable for the audience to view). In the case that the matrix is formed of square pixels, where the spacing is equal, then a direct mapping of the image to the display is performed. However, where there is a deviation from this arrangement, then a mapping of negative space is required so that when the image is projected onto the display, the missing space is accounted for.

It will be appreciated that the examples given in this description are non-limiting, and that a wide variety of applications are possible in which predetermined events detected during the occurrence of a sport are notified to the audience (with or without additional data) using a net 209 which is already present in the environment. Example nets include but are not limited to tennis nets, volleyball nets, ice hockey nets, soccer nets, and batting cage nets (including cricket batting cages or batting cages for other sports such as baseball). It is also envisaged that other nets present in the sporting environment (such as nets for restraining and/or protecting the audience during a sporting event) may also be fitted with electronic display elements 210 so as to enable images to be displayed on these nets in accordance with the present technique.

With the present technique, information relating to the sport being viewed is displayed in a way which does not require an additional display apparatus (such as a standalone electronic display or the like). Furthermore, since images are displayed on a net (which already is intrinsically part of the area within which the sport is being played), audience members, officials, broadcasters and the like are not required to turn their gaze away from the area within which the sport is being played. The audience experience is therefore improved (for both live audiences present at the sporting event and remote audiences watching via broadcast). Furthermore, officials of the sport (responsible for ensuring that the rules of the sport are adhered to) are able to be notified very quickly of the detection of a predetermined event (e.g. a ball in tennis being called "out") without the need for any sort of separate analysis or notification apparatus. This allows more accurate officiation and greater transparency in the application of officiation technology (since the match officials see the same information displayed on the net as all other members of the audience).

In some of the above-described embodiments, for the sake of clarity, the position of some portions of some of the images displayed on the example nets 209 may not correspond to the positions on the net 209 in which it is possible to place an electronic display element 210. However, it will be appreciated that such images are for the purpose of providing example applications of the present technique and that, in reality, all portions of an image displayed on a net will be located at the position of a respective electronic display element 210 on the net. More generally, it will be appreciated that all images displayed on a net 209 will have a resolution, pixel pitch, etc. corresponding to the positions on the net 209 at which electronic display elements 210 are placed.

Figure 11:
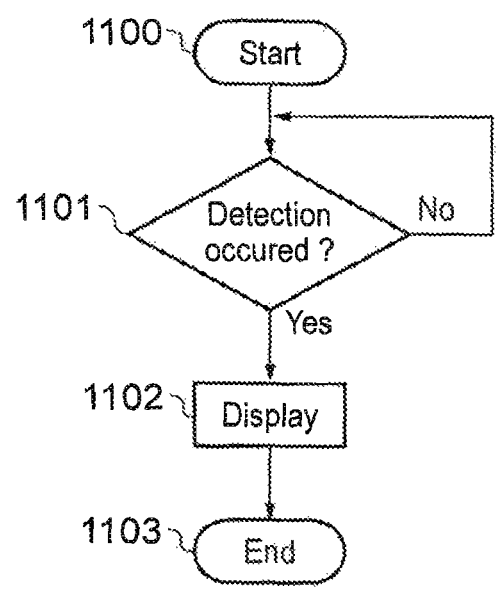
FIG. 11 schematically shows a method according to the present technique.

FIG. 11 shows a method of operating the sporting display device 104 according to an embodiment. The process starts at step 1100 at step 1101, it is determined as to whether the event detector 205 has detected the occurrence of a predetermined event associated with the sport with which the sports net 209 is associated. If such detection has not occurred, then the process returns to step 1101. On the other hand, if such detection has occurred, then the method proceeds to step 1102, in which the plurality of electronic display elements 210 is controlled to display one or more predetermined electronic images on the sports net 209. The process then ends at step 1103.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure may generally be described as:

1. A sporting display device comprising circuitry configured to control a plurality of electronic display elements to display one or more electronic images in response to a detection by detector circuitry of an occurrence of a predetermined event associated with a sport, the plurality of electronic display elements being attachable to a sports net associated with the sport in a configuration such that the one or more electronic images are displayed on the sports net.
2. A sporting display device according to clause 1, wherein:
   the predetermined event comprises an object associated with the sport crossing a boundary defined for the sport; and
   the one or more electronic images indicate that the boundary has been crossed by the object.
3. A sporting display device according to clause 2, wherein:
   the boundary defines an area within which the object must remain according to a rule of the sport and the predetermined event comprises the object leaving the area defined by the boundary; and
   the one or more electronic images indicate that the object has left the area defined by the boundary.
4. A sporting display device according to clause 2, wherein:
   a participant of the sport advances according to a rule of the sport when the object crosses the boundary; and
   the one or more electronic images indicate that a participant of the sport has advanced.
5. A sporting display device according to clause 1, wherein:
   the predetermined event comprises an object associated with the sport bouncing for the first time within a boundary defined for the sport; and
   the one of more electronic images indicates whether the object associated with the sport bounced for the first time within the boundary.
6. A sporting display device according to clause 5, wherein:
   the predetermined event comprises the object associated with the sport bouncing for the first time within or outside the boundary by a predetermined distance.
7. A sporting display device according to any one of clauses 2 to 4, wherein the object is a ball or hockey puck.
8. A sporting display device according to any one of clauses 2 to 7, wherein the position of the object relative to the boundary is determined by the detector circuitry based on one or more captured images of the object and the boundary.
9. A sporting display device according to any preceding clause, wherein:
   the predetermined event comprises an object associated with the sport contacting a sports net; and
   the one or more electronic images indicate that the objected has contacted the sports net.
10. A sporting display device according to clause 9, wherein the velocity of the object relative to the sports net is determined by the detector circuitry based on one or more of the captured images of the object and the sports net.
11. A sporting display according to clause 10, wherein the electronic images display a ripple whose intensity is determined in accordance with the velocity of the object.
12. A sporting display device according to clause 9, wherein the position of the object relative to the sports net is determined by the detector circuitry based on one or more captured images of the object and the sports net.
13. A system comprising:
    a sporting display device according to any preceding clause;
    detector circuitry configured to detect the occurrence of the predetermined event associated with the sport; and
    the plurality of electronic display elements.
14. A method of operating a sporting display device, the method comprising:
    determining whether detector circuitry has detected the occurrence of a predetermined event associated with a sport; and
    in response to determining that the detector circuitry has detected the occurrence of the predetermined event, controlling a plurality of electronic display elements to display one or more electronic images, the plurality of electronic display elements being attachable to a sports net associated with the sport in a configuration such that the one or more electronic images are displayed on the sports net.
15. A computer program for controlling a computer to perform a method according to clause 14.
16. A storage medium storing a computer program according to clause 15.
17. A matrix of display elements configured to display one or more electronic images in response to a detection by detector circuitry of an occurrence of a predetermined event associated with a sport, the matrix of electronic display elements being attachable to a sports net associated with the sport in a configuration such that the one or more electronic images are displayed on the sports net.

The invention claimed is:
1. A sporting display device comprising:
   circuitry configured to control a plurality of electronic display elements to display one or more electronic images in response to a detection by detector circuitry of an occurrence of a predetermined event associated with a sport, the plurality of electronic display elements being attachable to a sports net associated with the sport in a configuration such that the one or more electronic images are displayed on the sports net, wherein:
   the predetermined event comprises an object associated with the sport crossing a boundary defined for the sport,
   the one or more electronic images indicate that the boundary has been crossed by the object,
   the boundary defines an area within which the object must remain according to a rule of the sport and the predetermined event comprises the object leaving the area defined by the boundary, the one or more electronic images indicate that the object has left the area defined by the boundary, the position of the object relative to the boundary is determined by the detector circuitry based on one or more captured images of the object and the boundary, and at least an electronic image of the one or more electronic images displays a ripple whose intensity is determined in accordance with a velocity of the object relative to the sports net.

2. The sporting display device according to claim 1, wherein:

a participant of the sport advances according to a rule of the spoil when the object crosses the boundary, and the one or more electronic images indicate that a participant of the sport has advanced.

3. The sporting display device according to claim 1, wherein the object is a ball or hockey puck.

4. The sporting display device according to claim 1, wherein:

another predetermined event comprises the object associated with the sport contacting a sports net, and the one or more electronic images indicate that the objected has contacted the sports net.

5. The sporting display device according to claim 4, wherein the velocity of the object relative to the sports net is determined by the detector circuitry based on one or more of the captured images of the object and the sports net.

6. The sporting display device according to claim 4, wherein the position of the object relative to the sports net is determined by the detector circuitry based on one or more captured images of the object and the sports net.

7. A system comprising:

the sporting display device according to claim 1;

the detector circuitry configured to detect the occurrence of the predetermined event associated with the sport; and the plurality of electronic display elements.

8. A method of operating a sporting display device, the method comprising:

determining whether detector circuitry has detected an occurrence of a predetermined event associated with a sport; and in response to determining that the detector circuitry has detected the occurrence of the predetermined event, controlling a plurality of electronic display elements to display one or more electronic images, the plurality of electronic display elements being attachable to a sports net associated with the sport in a configuration such that the one or more electronic images are displayed on the sports net, wherein:

the predetermined event comprises an object associated with the sport crossing a boundary defined for the sport, the one or more electronic images indicate that the boundary has been crossed by the object, the boundary defines an area within which the object must remain according to a rule of the sport and the predetermined event comprises the object leaving the area defined by the boundary, the one or more electronic images indicate that the object has left the area defined by the boundary, wherein the position of the object relative to the boundary is determined by the detector circuitry based on one or more captured images of the object and the boundary, and at least an electronic image of the one or more electronic images displays a ripple whose intensity is determined in accordance with a velocity of the object relative to the sports net.

9. A non-transitory computer readable medium encoded with computer executable instructions for causing a computer to implement the method according to claim 8.

10. A device comprising:

a matrix of display elements configured to display one or more electronic images in response to a detection by detector circuitry of an occurrence of a predetermined event associated with a sport, the matrix of electronic display elements being attachable to a sports net associated with the sport in a configuration such that the one or more electronic images are displayed on the sports net, wherein:

the predetermined event comprises an object associated with the sport crossing a boundary defined for the sport, the one or more electronic images indicate that the boundary has been crossed by the object, the boundary defines an area within which the object must remain according to a rule of the sport and the predetermined event comprises the object leaving the area defined by the boundary, the one or more electronic images indicate that the object has left the area defined by the boundary, the position of the object relative to the boundary is determined by the detector circuitry based on one or more captured images of the object and the boundary, and at least an electronic image of the one or more electronic images displays a ripple whose intensity is determined in accordance with a velocity of the object relative to the sports net.

\* \* \* \* \*